United States Patent [19]
Cochcroft, Jr.

[11] Patent Number: 5,752,261
[45] Date of Patent: May 12, 1998

[54] METHOD AND APPARATUS FOR DETECTING THRASHING IN A CACHE MEMORY

[75] Inventor: Arthur F. Cochcroft, Jr., West Columbia, S.C.

[73] Assignee: NCR Corporation, Dayton, Ohio

[21] Appl. No.: 745,035

[22] Filed: Nov. 7, 1996

[51] Int. Cl.$^6$ .................................................. G06F 12/12
[52] U.S. Cl. ........................................ 711/133; 711/128
[58] Field of Search ................................. 711/133, 128, 711/134, 118, 159, 206, 202, 221

[56] References Cited

U.S. PATENT DOCUMENTS

| | | | |
|---|---|---|---|
| 5,019,971 | 5/1991 | Lefsky et al. | 395/182.03 |
| 5,101,485 | 3/1992 | Perazzoli, Jr. | 711/206 |
| 5,119,290 | 6/1992 | Loo et al. | 711/210 |
| 5,136,700 | 8/1992 | Thacker | 711/122 |
| 5,175,834 | 12/1992 | Sawai | 711/151 |
| 5,185,861 | 2/1993 | Valencia | 395/872 |
| 5,210,843 | 5/1993 | Ayers | 711/128 |
| 5,210,845 | 5/1993 | Crawford et al. | 711/128 |
| 5,226,146 | 7/1993 | Milia et al. | 711/141 |
| 5,274,790 | 12/1993 | Suzuki | 711/133 |
| 5,287,508 | 2/1994 | Hejna, Jr. et al. | 395/672 |
| 5,317,738 | 5/1994 | Cochcroft, Jr. et al. | 395/673 |
| 5,353,424 | 10/1994 | Partovi et al. | 711/128 |
| 5,442,571 | 8/1995 | Sites | 395/500 |
| 5,603,004 | 2/1997 | Kurpanek et al. | 711/118 |
| 5,630,097 | 5/1997 | Orbits et al. | 711/165 |

*Primary Examiner*—Tod R. Swann
*Assistant Examiner*—J. Peikari
*Attorney, Agent, or Firm*—Maginot, Addison and Moore

[57] ABSTRACT

A cache controller for a cache memory having a number of cache lines includes a page index monitor and a page index tracker coupled to the page index monitor. The page index monitor is configured to update a thrashing value associated with a cache line identified by a first page index. The page index includes a tracking controller and a replacement tracking store. The tracking controller is configured to store a first tag and a second tag in the replacement tracking store when a first data stored in the cache line is replaced with a second data where the first data is also stored in a first main memory location identified by a first address having said first page index and said first tag, and the second data is stored in a second main memory location identified by a second address having the first page index and the second tag.

21 Claims, 6 Drawing Sheets

METHOD AND APPARATUS FOR DETECTING THRASHING IN A CACHE MEMORY

BACKGROUND OF THE INVENTION

The present invention relates generally to a cache memory, and more particularly to a method and apparatus for improving the performance of a cache memory by detecting and reducing thrashing in the cache memory.

A cache memory is typically used in data processing systems to decrease the memory access time for a central processing unit (CPU) thereof. A cache memory is a relatively small, high speed memory in which active data items (program instructions and/or data) are placed. A cache memory is typically faster than main memory by a factor of 5 to 10 and typically approaches the speed of the CPU itself. By keeping the most frequently accessed data items in the high speed cache memory, the average memory access time will approach the access time of the cache.

The active program data items may be kept in a cache memory by utilizing the property known as "locality of reference." The locality of reference property recognizes that the execution of most computer programs proceeds in a sequential fashion with multiple loops. As a result of this typical progression, the CPU repeatedly executes a set of instructions in a particular localized area of memory. Similarly, memory references to data also tend to be localized, because table lookup routines or other iterative routines typically refer repeatedly to a small portion of data.

In view of the property of locality of reference, a small, high speed cache memory may be provided for storing a block of data items (data and/or instructions) from main memory which are presently being processed. Although the cache is only a small fraction of the size of the main memory, a large fraction of memory requests will locate data items within the cache memory due to the locality of reference property of programs. In a computer system which has a relatively small, relatively high speed cache memory and a relatively large, relatively low speed main memory, the CPU examines the cache when a memory access instruction is processed. If the desired data item (data and/or instruction) is found in the cache, then the data is read from the cache. However, if the data item is not found in the cache, then the data item is transferred from the main memory to the CPU and a block of data items containing the desired data item is transferred from main memory to cache memory Accordingly, future references to memory are likely to find the required data items in the cache memory because of the locality of reference property.

Typical forms of cache memory construction include direct-mapped caches and set associative caches. A direct-mapped cache provides the simplest and fastest cache memory, but severely limits the number of cache locations where a particular data item may reside to only one location. When two or more heavily used data items map to the same location in a direct-mapped cache, and these data items are used by a program in a cyclic manner, as in a loop, cache thrashing occurs.

Thrashing, in the context of a cache memory, is defined as the state of a cache memory that is spending almost all its time swapping cache lines containing referenced data items in and out of the cache memory in response to memory references by the CPU. In particular, as each data item is referenced, it displaces its predecessor, causing a relatively slow main memory access. Cache thrashing can severely degrade program execution speed by forcing many main memory accesses.

A set-associative cache memory provides two or more locations to which a data item may map. As a result, a set-associative cache reduces the probability of cache thrashing by increasing the probability of finding recently-used data items in the cache memory. However, cache thrashing may still occur in a set-associative cache memory if the computer system is cycling through a set of data items which map to a set of cache memory locations that does not include enough memory locations to concurrently hold the entire set of cyclically referenced data items.

What is needed therefore is a method and apparatus for improving the performance of a direct-mapped cache memory and a set-associative cache memory by detecting which memory references are causing thrashing therein.

For this disclosure, a kilobyte (KB) is defined as $2^{10}$ bytes or 1,024 bytes; a megabyte (MB) is defined as $2^{20}$ bytes or 1,048,576 bytes; and, a gigabyte (GB) is defined as $2^{30}$ bytes or 1,073,741,824 bytes. Furthermore, a number followed by a K means that number multiplied by 1,024; and a number followed by a M means that number multiplied by 1,048,576.

SUMMARY OF THE INVENTION

In accordance with one embodiment of the present invention, there is provided a method of detecting thrashing in a cache memory having a plurality of cache lines. The method includes the steps of storing a first data in a first main memory location identified by a first address having a first page index and a first tag; storing a second data in a second main memory location identified by a second address having the first page index and a second tag; storing the first data in a first cache line identified by the first page index; referencing the cache memory with the second address; replacing the first data stored in the first cache line with the second data; storing the first tag in a third memory location; and storing the second tag in a fourth memory location.

Pursuant to another embodiment of the present invention, there is provided a cache controller for a cache memory having a number of cache lines. The cache controller includes a page index monitor and a page index tracker coupled to the page index monitor. The page index monitor is configured to update a thrashing value associated with a cache line identified by a first page index. The page index includes a tracking controller and a replacement tracking store. The tracking controller is configured to store a first tag and a second tag in the replacement tracking store when a first data stored in the cache line is replaced with a second data, where the first data is also stored in a first main memory location identified by a first address having the first page index and the first tag, and the second data is stored in a second main memory location identified by a second address having the first page index and the second tag.

Pursuant to another embodiment of the present invention, there is provided a computer system. The computer system includes a processor, a main memory, a cache memory, and a cache controller coupled to the processor, the main memory, and the cache memory. The cache memory has a first cache line identified by a first page index. The cache controller includes a page index monitor and a page index tracker coupled to the page index monitor. The page index monitor is configured to update a thrashing value associated with the first cache line. The page index tracker includes a tracking controller and a replacement tracking store wherein the tracking controller is configured to store a first tag and a second tag in the replacement tracking store when a first data stored in the first cache line is replaced with a second data, where the first data is also stored in a first main memory location identified by a first address having the first page index and the first tag, and the second data is stored in a second main memory location identified by a second address having the first page index and the second tag.

It is an object of the present invention to provide a new and useful method of detecting thrashing in a cache memory.

It is also an object of the present invention to provide an improved method of detecting thrashing in a cache memory.

It is another object of the present invention to provide a new and useful method to detect cache thrashing in computer systems employing direct mapped cache memory.

It is an object of the present invention to provide a new and useful method to reduce cache thrashing.

It is an object of the present invention to provide a new and useful cache controller.

It is another object of the present invention to provide an improved cache controller.

It is yet another object of the present invention to provide a cache controller that detects and identifies thrashing pages of main memory.

It is yet a further object of the present invention to provide a new and useful computer system.

It is yet a further object of the present invention to provide a computer system having improved cache performance.

The above and other objects, features, and advantages of the present invention will become apparent from the following description and the attached drawings.

DETAILED DESCRIPTION OF A PREFERRED EMBODIMENT

Figure 1:
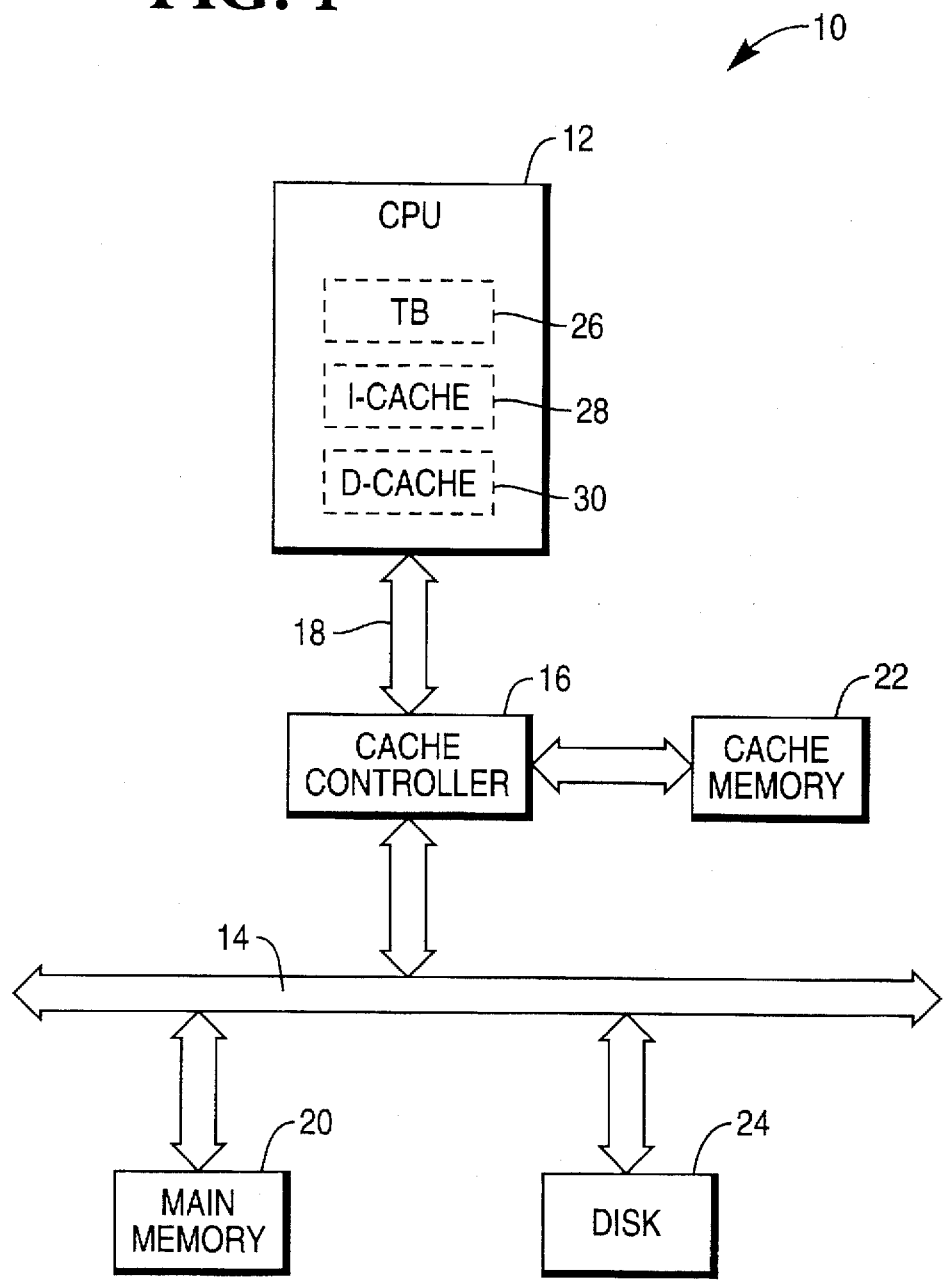
FIG. 1 is a simplified block diagram of an exemplary computer system incorporating the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a simplified block diagram of an exemplary computer system 10 which incorporates the features of the present invention therein. The computer system 10 includes a central processing unit (CPU) 12 coupled to a system bus 14 through a cache controller 16 and a CPU bus 18. A main or physical memory 20 is connected to and accessed by the system bus 14, and a cache memory 22 is connected to the cache controller 16 such that the cache memory 22 is directly accessed by the CPU bus 18. The CPU 12 implements a virtual memory management system so that pages of data may be swapped between physical memory provided by main memory 20 and secondary storage in the form of a disk 24.

In the embodiment being described, the cache memory 22 may be a direct-mapped cache memory. However, it should be appreciated that the cache memory 22 may also be a set-associative cache memory such as a 2-way or 4-way set associative cache memory. The CPU 12 of FIGS. 1 may also have internal cache memory, including an instruction cache or I-cache 28, and a data cache or D-cache 30. The memory subsystems used by computer system 10 are thus hierarchical, with the fastest memory being the internal caches 28 and 30, the next fastest being the cache memory 22, then the main memory 20, and finally the swap space in the disk 24.

The difference in speed (i.e. access time) between the fastest memory subsystem and slowest memory subsystem is many orders of magnitude. The internal caches 28 and 30 and the cache 22 are typically accessed within a few CPU cycles, while the main memory 20 is typically accessed in the range of about ten to one-hundred or more CPU cycles, and a page swap to disk 24 typically requires many hundreds or thousands of CPU cycles. The performance of the computer system 10 therefore is highly dependent upon maintaining instructions and data that are currently being used in the caches 22, 28, and 30.

Figure 2:
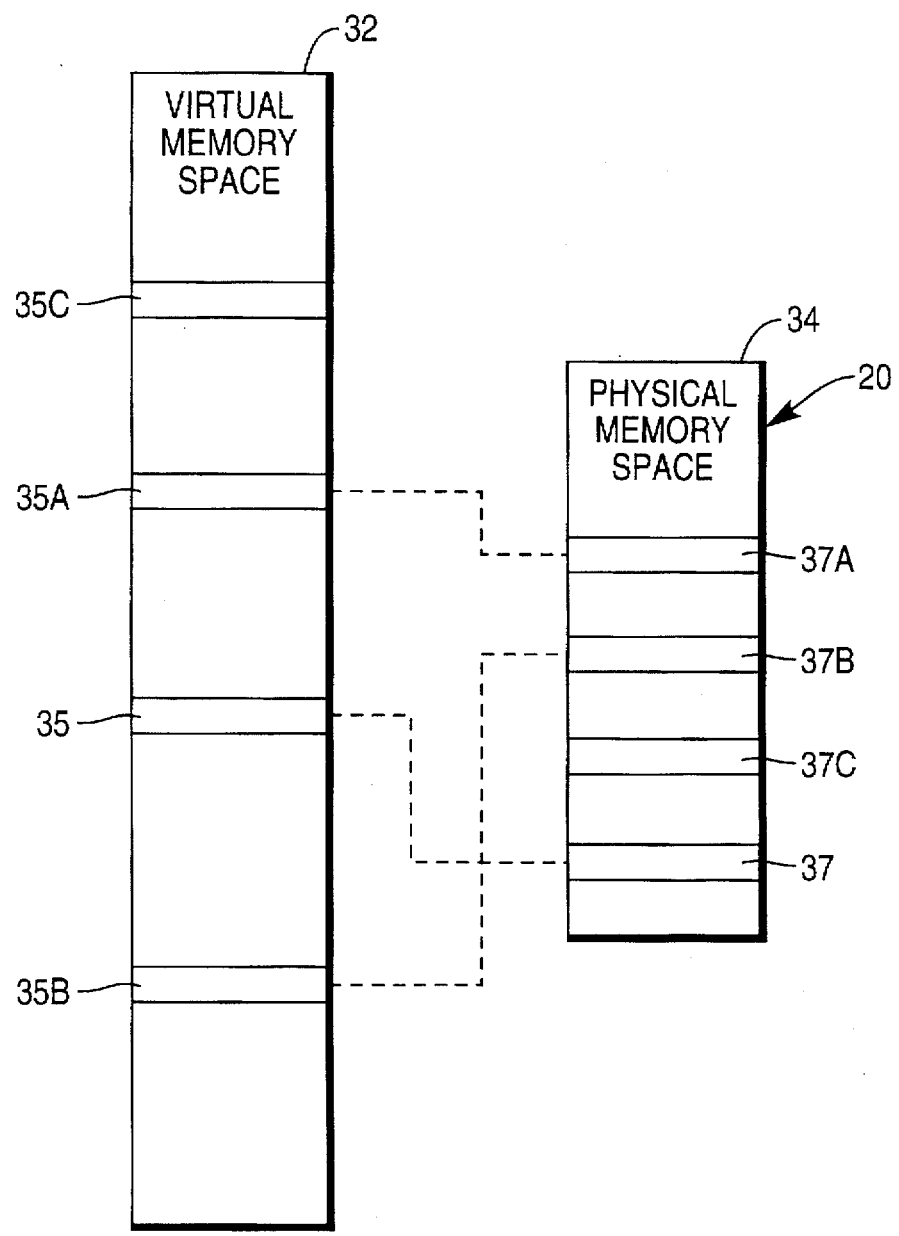
FIG. 2 is a diagram showing the relationship between virtual memory space and physical memory space.

As shown in FIG. 2, the CPU 12 generates references to main memory 20 by forming a virtual address defining a byte within the virtual memory space 32, and translating the virtual address to a physical address within the physical memory space 34. The virtual memory space 32 is defined by the architectural specifications of the computer system 10 or that portion of it allowed by the operating system to be accessed. The physical memory space 34, however, is constrained by the amount of the main memory 20.

The computer system 10, of the exemplary embodiment, generates 32-bit virtual addresses for referencing bytes of main memory 20. Therefore, the computer system 10 has a byte-addressable virtual memory space 32 of 4 GB. Furthermore, the exemplary computer system 10 has 64 MB of main memory 20, and a 4 MB direct-mapped cache 22 having cache lines of 32 bytes. The exemplary computer system 10 also uses pages of 4 KB to map the virtual memory space 32 to the physical memory space 34.

As stated above, the translation from virtual memory space 32 to physical memory space 34 is accomplished in pages of 4 KB. That is, a 4 KB contiguous block of a virtual page 35 (FIG. 2) maps to a 4 KB contiguous block of a physical page 37 (FIG. 2). A page table (not shown) is maintained in main memory 20 to provide the translation between virtual memory space 32 and physical memory space 34, A translation buffer 26 (FIG. 1) may be included in the CPU 12 which maintains page table entries for the most recent translations so that a reference to the page table in main memory 20 need not be made to obtain the translation before a data reference can be made.

Only the pages used by tasks currently executing (and the operating system itself) are likely to be in the main memory 20 at a given time. A translation to a physical page 37 is in the page table for only those physical pages 37 actually in the main memory 20. When the virtual page 35 being referenced by the CPU 12 is not found in the main memory 20, a page fault is executed to initiate a swap operation in which a physical page 37 from the main memory 20 is swapped with the desired virtual page 35 maintained in the disk memory 24.

Figure 3:
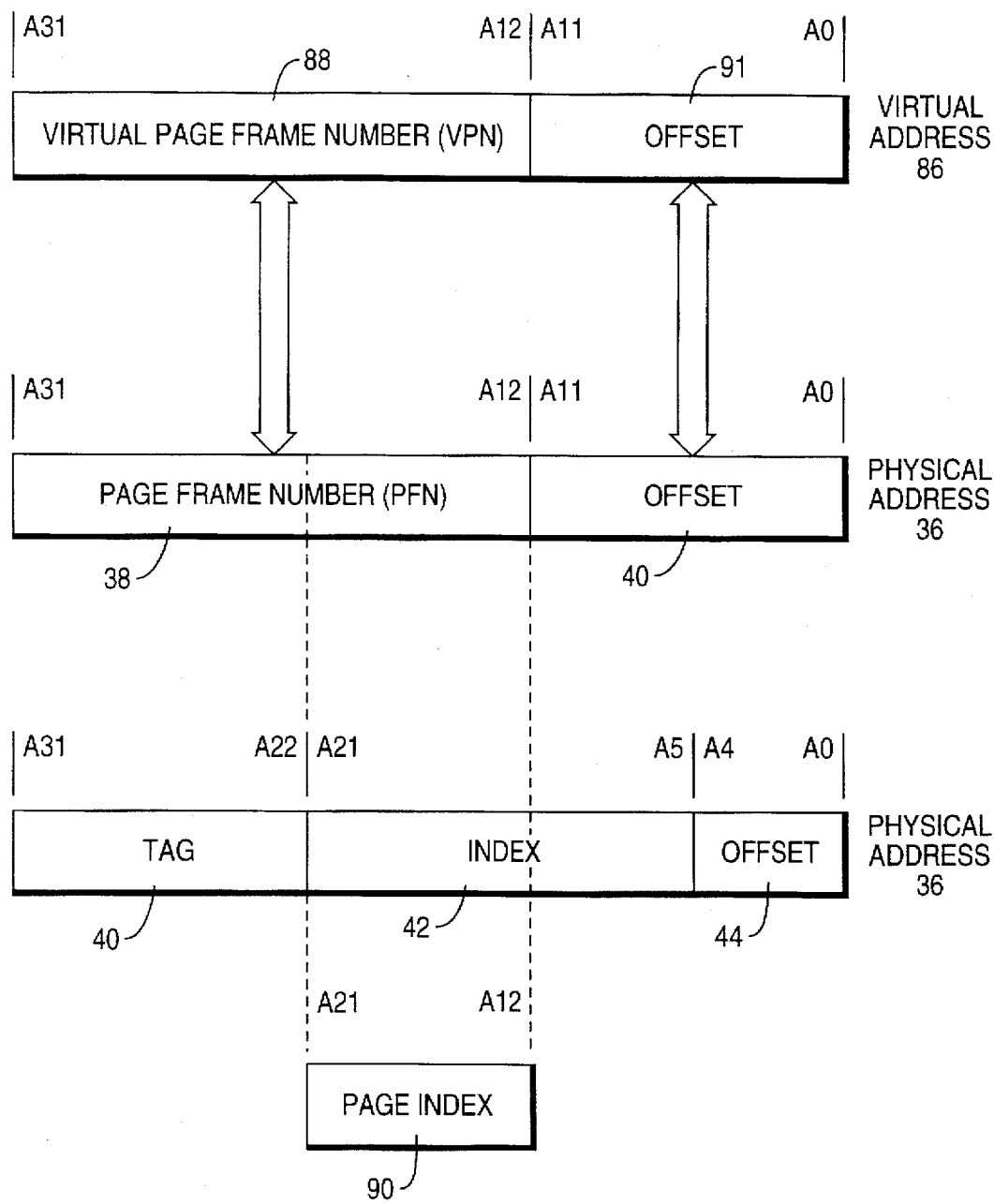
FIG. 3 is a diagram showing the mapping of a virtual address to a physical address and mappings of a physical address to a cache index and a page index.

Now referring to FIG. 3, there is shown a diagram of the mapping of a virtual address 86 to a physical address 36 and the mapping of a physical address 36 to a cache index 42 and a page index field 90. The virtual address 86 includes a virtual page frame number (VPN) field 88 and an offset field 91. The offset field 91 defines to which byte within a virtual page 35 the CPU 12 is referencing. Because the exemplary embodiment uses virtual pages 35 of 4 KB the offset field 91 must be at least 12 bits wide in order to uniquely identify each byte of a 4 KB page. Therefore, the offset field 91 is made up of the 12 least significant bits (LSB) (A11–A0) of the virtual address 86 thereby providing the 4K unique values needed to uniquely identify the 4K bytes of a virtual page 35.

The VPN field 88 defines to which virtual page 35 within the virtual memory space 32 the CPU 12 is referencing. Because the exemplary embodiment has a 4 GB virtual memory space 32 made up of virtual pages 35 of 4 KB, the VPN field 88 must be at least 20 bits wide in order to uniquely identify the 1M virtual pages 35 of the 4 GB virtual memory space 32. Therefore, the VPN field 88 is made up of the 20 most significant bits (MSB) (A31–A12) of the virtual address 86 thereby providing 1M values to uniquely identify the 1M virtual pages 35 of the virtual memory space 32.

A physical address 36 may be broken up into a page frame number (PFN) field 38 and an offset field 40. The offset field 40 defines to which byte within a physical page 37 of physical memory space 34 the CPU 12 is referencing. Because the exemplary embodiment has physical pages 47 of 4 KB, the offset field 91 must be at least 12 bits wide in order to uniquely identify each byte of a 4 KB physical page 37. Therefore, the offset field 40 is made up of the 12 least significant bits (LSB) (A11–A0) of the physical address 86 thereby providing 4K unique values to identify the 4K bytes of the physical page 37. Because the offset field 91 of the virtual address 86 and the offset field 40 of the physical address 36 are both 12 bits wide and are both used to uniquely identify a 4 KB memory space, the CPU 12 does not need to alter the value of the offset field 91 when mapping a virtual address 86 to a physical address 36.

The PFN field 38 defines to which physical page 37 within the physical memory space 34 the CPU 12 is referencing. Because the exemplary embodiment has only 64 MB of main memory 20 to define physical memory space 34 made up of 4 KB physical pages 37, the PFN field 38 must be at least 14 bits wide in order to uniquely identify the 16K physical pages 37 of the 64 MB physical address space.

However, the amount of physical memory space 34 may be easily increased in the computer system 10 by adding either additional memory modules or replacing existing memory modules of main memory 20. As a result, the PFN field 38 should contain enough bits to uniquely identify as much memory as the computer system 10 may uniquely identify which in the exemplary embodiment is 4 GB. Therefore, the PFN 38 is made up of the 20 most significant bits (MSB) (A31–A12) of the physical address 86 thereby providing 1M values to uniquely identify the 1M pages the computer system 10 could uniquely identify if 4 GB of main memory 20 were present.

The CPU 12 in the exemplary embodiment may generate virtual addresses 86 for 4 GB of data; however the main memory 20 is only 64 MB. As a result, most of the possible values for the VPN field 88 would be invalid for the CPU 12 to use for the PFN field 38 because the resulting physical address 36 would reference a memory location which has no corresponding location in main memory 20. Therefore, the CPU 12 maintains a table in main memory 20 and the translation buffer 26 to map the 1M unique values for the VPN field 88 to the 16K values for PFN field 38 which correspond to locations in main memory 20.

Figure 4:
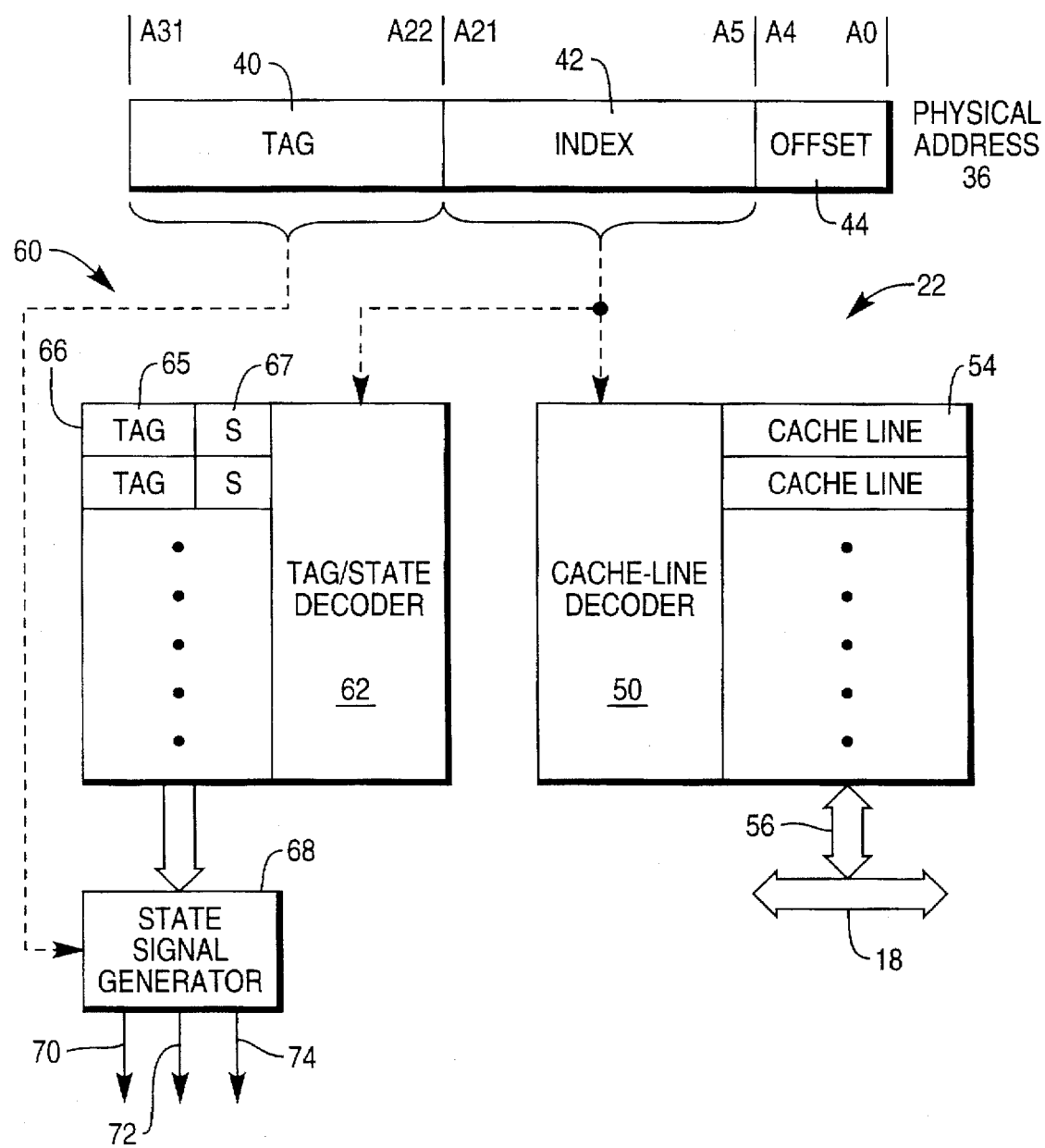
FIG. 4 is a simplified block diagram of the direct-mapped cache of FIG. 1 along with a tag/state store.

In FIG. 4, there is shown a diagram of the direct-mapped cache 22 (FIG. 1) along with a tag/state store 60 which is typically part of the cache controller 16 (FIG. 1). The direct-mapped cache 22 includes a cache line decoder 50 and several cache lines 54. The tag/state store 60 includes a tag/state decoder 62 and a tag/state line 66 for each cache line 54 of the cache 22.

A physical address 36 on the CPU bus 18 used to access the cache 22 (or main memory 20) contains an offset field 44, an index field 42, and a tag field 40. The offset field 44 selects the byte (or word) within a cache line 54. The index field 42 is applied to the cache line decoder 50 to select a cache line 54 within the cache 22 and is applied to the tag/state decoder 62 to select a tag/state line 66 within the tag/state store 60 which corresponds to the selected cache line 54. The tag field 40 is used to uniquely identify to which physical address 36 the cache line 54 corresponds.

The tag/state store 60 holds a number of tag fields 65 and state fields 67 corresponding to the cache lines 54 of the cache 22. The state fields 67 are used to determine the state of the data stored in the corresponding cache line 54 such as whether the data is valid and/or dirty. The data in a cache line 54 could be invalid for various reasons. For example, the data may be invalid because no prior accesses have been made to the cache line 54, or another processor or a DMA device has invalidated the cache line 54 due to writing to a location in main memory 20 which maps to the cache line 54.

Furthermore, the data stored in the cache line 54 may be dirty in a write-back cache environment where data is first written to the cache 22 and is later written to the main memory 20. The dirty bit allows the cache controller 16 to determine whether the data contained in the cache line 54 needs to be written to main memory 20 or disk memory 24 before being replaced by other data.

The tag/state decoder 60 uses the value in the index field 42 to select the tag field 65 and state field 67 which correspond to the cache line 54 selected by the cache line decoder 50. The values stored in the tag field 65 and the state field 67 selected by the tag/state decoder 62 along with the value of the tag field 40 are sent to a state signal generator 68. The state signal generator 68, generates a cache hit signal on an output line 70 if the value of tag field 65 matches the value of the tag field 40, and the value for the state field 67 indicates that the data stored in the selected cache line 54 is valid. If the above conditions are not met, the state generator 68 generates a cache miss signal on the output line 70. When a cache miss occurs, a reference to main memory 20 must be made. Therefore, the physical address 36 is passed through the cache controller 16 to the system bus 14 to obtain the data from main memory 20.

The state signal generator 68 also generates a cache access signal on an output line 72 and a cache replacement signal on an output line 74. The cache access signal is generated every time a reference to the cache 22 causes the state signal generator 68 to receive values from the tag field 65 and the state field 67. Furthermore, the replacement signal is generated when a cache miss occurs and the cache line 54, which will be replaced with data from main memory 20, currently contains valid data as indicated by the state field 67 corresponding to the cache line 54.

As stated above, the cache 22 contains cache lines 54 which can each store 32 bytes of data. As a result, the offset field 44 which is used to uniquely identify a byte within a cache line 54 must be at least 5 bits wide to identify the 32 bytes of each cache line 54. Therefore, the 5 LSB (A4–A0) of the physical address 36 are used for the offset field 44 thereby providing 32 unique values to identify the 32 bytes of a cache line 54. Furthermore, as stated above, the cache 22 can store 4 MB of data, and each cache line can store 32 bytes of data. Therefore, the cache 22 contains 128K (4 MB/32 bytes) cache lines 54. As a result, the index field 42, which is used to uniquely identify each cache line 54 within the cache 22, must be at least 17 bits wide to uniquely identify each of 128K possible cache lines 54. Therefore, the 17 LSB (A21–A5) following the offset field 44 of the physical address 36 are used for the index field 42. Finally, the tag field 40 is comprised of the 10 MSB (A31–A22) of the physical address 36 thereby providing 1K unique values for identifying each of the 1 K possible 32 byte blocks of the virtual memory space 32 which may be stored in each cache line 54.

Referring back to FIG. 3, the page index field 90 of the physical address 36 is defined as the overlap of the PFN field 38 and the index field 42. Therefore, in the exemplary embodiment, the page index field 90 is made up of bits A21–A12 of the physical address 36. As a result of this scheme of mapping virtual pages 35 to physical pages 37 and physical pages 37 to the cache 22, all physical pages 37 having the same value for the page index field 90 will map to the same locations in the cache 22. If the CPU 12 were to cyclically reference two physical pages 35 having identical values for the page index field 90, then a thrashing condition could occur if repetitive references to the two physical pages caused referenced cache lines 54 of the cache 22 to be repetitively replaced.

If the computer system 10 could detect which physical pages 37 of the main memory 20 were causing the cache 22 to thrash, then the CPU 12 could remedy the situation by (1) moving the thrashing physical pages 37 so that they have different values for the page index field 90 and (2) updating the translation table stored in the translation buffer 26 and the main memory 20 so that the virtual pages 35 corresponding to the thrashing physical pages 37 map correctly to the moved physical pages 37. By doing so, the previously thrashing physical pages 37 will no longer map to the same location in cache 22 and as a result will no longer thrash with one another.

Before thrashing physical pages 37 may be re-mapped from virtual memory space 32 to physical memory space 34, the physical pages 37 which are thrashing must first be detected. The existence of these thrashing physical pages 37 is of course data-dependent, and application software dependent. Therefore, prediction before runtime of when thrashing will occur is virtually impossible. Furthermore, in another invocation of the software, the instances of thrashing will probably occur at different times and places in the program. In other words, the software in question must be running before it may be determined whether thrashing exists, and before the locality of each instance of thrashing is known.

Figure 5:
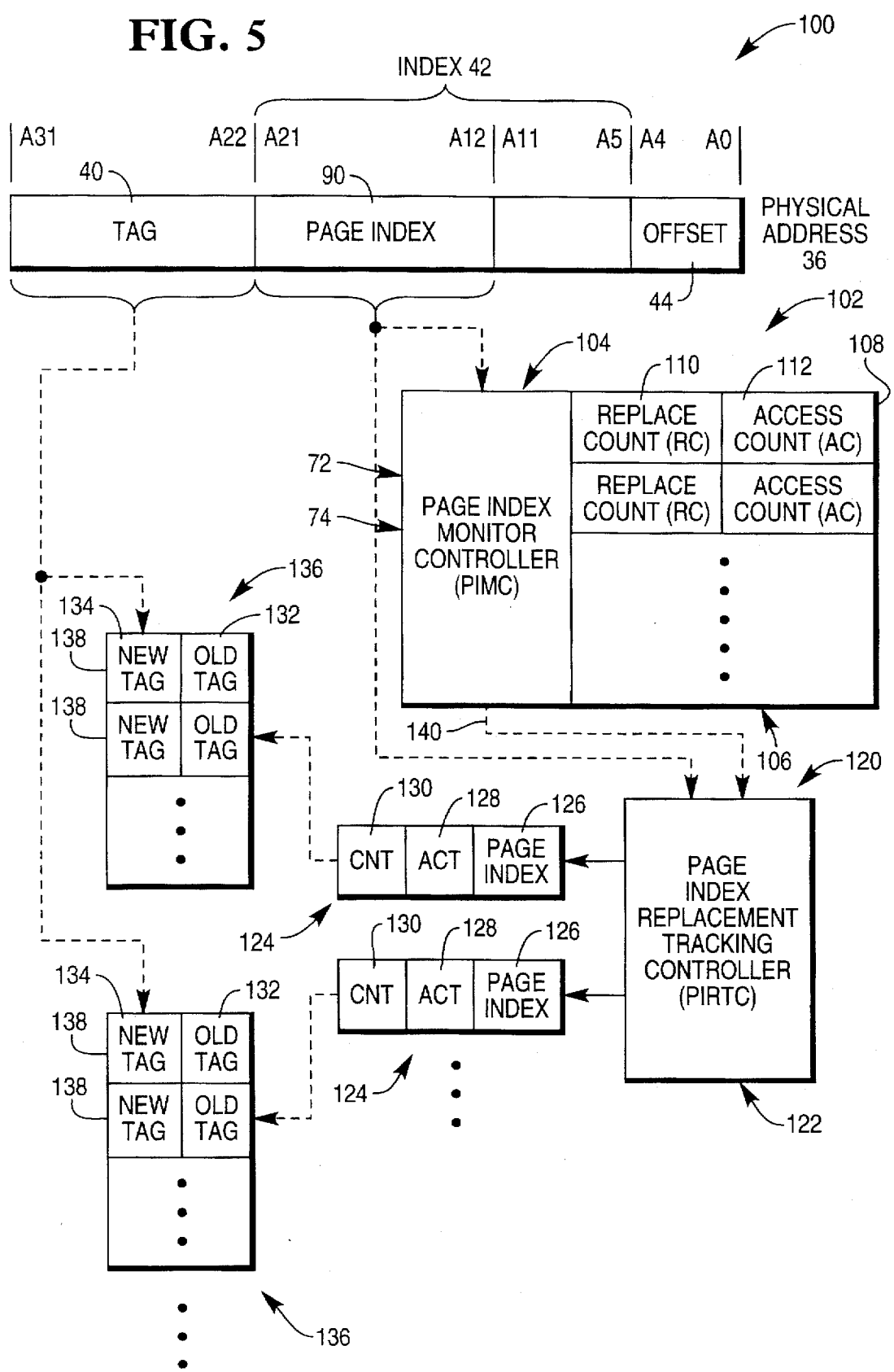
FIG. 5 is a simplified block diagram showing the thrashing detection and reduction circuit of the cache controller of FIG. 1.

Referring now to FIG. 5, there is shown a thrashing detection and reduction circuit (TDRC) 100 of the cache controller 16 (FIG. 1). The TDRC 100 includes a page index monitor (PIM) 102 and a page index tracker (PIT) 120 which collectively determine physical pages 37 which are causing the cache 22 to thrash. The PIM 102 includes a page index monitor controller (PIMC) 104 and a page index monitor memory (PIMM) 106.

In response to signals generated by the state signal generator 68 (FIG. 4), the PIMC 104 controls and updates the contents of the PIMM 106. In the exemplary embodiment, the PIMM 106 contains a count line 108 for each unique value of the page index field 90. Because in the exemplary embodiment the page index field 90 is 10 bits, there are 1K unique values for the page index field 90, and, therefore, 1K count lines 108 in the PIMM 106 corresponding with the 1K possible page index values.

Each count line 108 contains a replacement count field (RC) 110 and an access count field (AC) 112. The replacement count field 110 stores a value representing the number of times the data in the cache 22 identified by the page index field 90 has been replaced. The access count field 112 stores a value representing the number of times the data in the cache 22 identified by the page index field 90 has been accessed.

The page index tracker 120 includes a page index replacement tracking controller (PIRTC) 122, several page index replacement tracking registers (PIRTR) 124, and a replacement tracking store (RTS) 136 for each PIRTR 124. Each PIRTR 124 includes a page index field 126, an activation field 128, and a count field 130. The page index field 126 is wide enough to store the page index field 90 of the physical address 36. In other words, in the exemplary embodiment, the page index field 126 is 10 bits wide. The activation field 128 in the exemplary embodiment is one bit wide and is used by the PIRTC 122 to determine whether a PIRTR 124 contains active information. Furthermore, the count field 130 stores a value representing the number of times since the PIRTR 124 was activated that the data identified by the page index 126 has been replaced in the cache 22.

The RTS 136 has a replacement line 138 for each possible value of the count field 130. Each replacement line 138 is uniquely identified by the count field 130 and includes an old tag field 132, and a new tag field 134. The old tag field 132 stores the value of the tag field 40 corresponding to the information in the cache 22 which was replaced by the current memory reference. The new tag field 134 stores the value of the tag field 40 of the current memory reference which replaced information in the cache 22. Because the tag field 40 of the exemplary embodiment is 10 bits wide, both the old tag field 132 and the new tag field 134 are each 10 bits wide so that they may store the value of the tag field 40.

During operation of the computer system 10, the direct-mapped cache 22 is initialized by (1) deactivating the valid bits of the state field 67 (FIG. 4) of the tag/state store 66 (FIG. 4), (2) deactivating the activation field 128 (FIG. 5) for all of the replacement registers 124 (FIG. 5), and (3) setting all of the replacement count fields 110 and the access count fields 112 to zero. The initialization of the cache 22 typically takes place at power-up or when the cache 22 is flushed. (Flushing the cache refers to writing all dirty data back to memory and invalidating all the cache lines).

Figure 6:
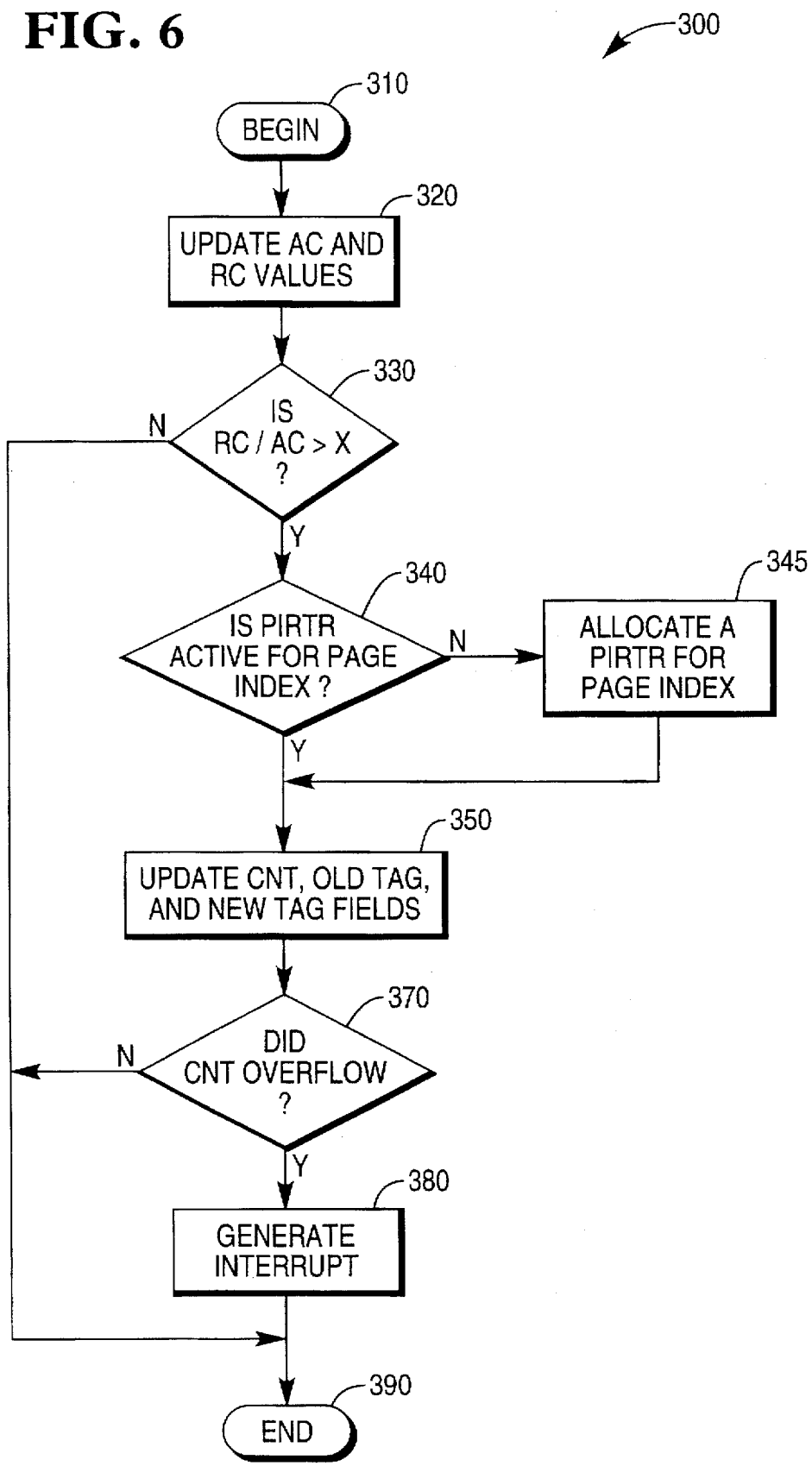
FIG. 6 is a procedural flowchart illustrating the operation of the thrashing detection and reduction circuit of FIG. 5

Referring now to FIG. 6, there is shown a procedural flowchart 300 setting forth the operation of the thrashing detection and reduction circuit (TDRC) 100 (FIG. 5) after the cache 22 has been initialized. The operation of the TDRC 100 is initiated (step 310) as a result of the PIMC 104 receiving an cache access signal from the state signal generator 68 (FIG. 4) on line 72. Upon receiving the cache access signal from the state signal generator 68, the PIMC 104 increments the access count field 112 identified by the page index field 90 (step 320). The PIMC 104 also increments the replacement count field 110 identified by the page index field 90 if the PIMC 104 also received a cache replacement signal from the state signal generator 68 on line 74.

Because only a limited number of bits are used for the replacement count field 110 and the access count field 112, it is possible for an overflow condition to occur. If incrementing the values stored in the access count field 112 or the replacement count field 110 would result in an overflow condition, the PIMC 104 lowers the values stored in the access count field 112 and the replacement count field 110 such that the value for the ratio of the replacement count field 110 over the access count field 112 is kept substantially the same as the prior ratio of these two fields. The PIMC 104 may accomplish this result by shifting the bit values of the access count field 112 and the replacement count field 110 by the same number of bits.

After the PIMC 104 updates the value stored in the access count field 112 and possibly the value stored in the replacement count field 110, the PIMC 104 determines whether a thrashing ratio (defined as the value stored in the replacement count field 110 over the value stored in the access count field 112) is greater than a predetermined threshold value (X) (step 330). If the thrashing ratio is not greater than the threshold value (X), then the TDRC 100 is done processing the current memory reference and the TDRC 100 advances to step 390. If the thrashing ratio (RC/AC) is greater than the threshold value (X), then the PIMC 104 sends a signal to the PIRTC 122 on a line 140. In the exemplary embodiment, the threshold value (X) is programmable thereby allowing the performance of the cache 22 to be adjusted for differences in operating conditions of the computer system 10.

The thrashing ratio (RC/AC) represents the number of cache line replacements per memory reference to page index field 90. If every memory reference to page index field 90 caused the cache 22 to replace a cache line 54, then the thrashing ratio (RC/AC) would be equal to one. As a result, a thrashing ratio of one, for a page index field 90 means the cache 22 is not providing any performance gain for memory references to page index field 90 because every memory reference is resulting in a reference to main memory 20 in order to replace the data in the respective cache line 54.

Thrashing ratios of as low as 0.10 and 0.05 for many computer systems result in a large performance decrease. Consequently, the threshold value (X) is typically quite low with values between 0.05 and 0.10 being adequate for most computer systems. As a result of such low threshold values, the replacement count field 110 does not need to be as wide as the access count field 112. It is believed that satisfactory results may be obtained with a replacement count field 110 of m/3 bits wide and an access count field 112 of 2m/3 bits wide, where m is the combined bit width of the replacement count field 110 and the access count field 112.

Upon receiving the signal on line 140, the routine advances to step 340 where the PIRTC 122 determines whether an active PIRTR 124 has been allocated for the value of the page index field 90. If an active PIRTR 124 has been allocated, then the routine advances to step 350. However, if an active PIRTR 124 has not been allocated, then the PIRTC 122 allocates a PIRTR 124 by (1) loading the value of the page index field 90 into the page index field 126, and (2) activating the activation bit 128. After allocating a PIRTR 124 for the page index field 90, the PIRTC 122 proceeds to step 350. It should be appreciated that PIRTC 122 may use various allocation schemes for allocating a page index to a PIRTR 124 with simplistic allocation schemes having the advantages of cheaper implementation, faster execution, and less (possibly no) use of the CPU 12 for allocating the PIRTR's 124.

In step 350, the PIRTC 122 updates the count field 130, the old tag field 132, and the new tag field 134 for the PIRTR 124 allocated to the page index field 90. In particular, the PIRTC 122 updates the old tag field 132 by storing into the old tag field 132 the value of the tag field 65 (FIG. 4) corresponding to the cache line 54 being replaced. Furthermore, the PIRTC 122 updates the new tag field 134 by storing into the new tag field 134 the value of the tag field 40 corresponding to the replacing cache line 54. Finally, the PIRTC 122 updates the count field 130 by incrementing the value stored in the count field 130. It should be appreciated that in the exemplary embodiment the count field 130 is used as an index for identifying which of the storage locations in the RTS 136 to store the values for the old tag 132 and the new tag 134; however various other means for allocating storage locations within the RTS 136 may be used.

In step 370, the PIRTC 122 determines whether the count field 130 overflowed as a result of incrementing the value stored in the count field 130. If the PIRTC 122 determines that the count field 130 did not overflow then the TDRC 100 is finished processing the physical address 36 and the TDRC 100 advances to step 390. If incrementing the value stored in the count field 130 results in an overflow condition, then the TDRC 100 advances to step 380. It should be appreciated that the TDRC 100 may be designed to advance to step 380 when the count field 130 reaches some predetermined threshold value less than overflow. In other words, if count field 130 has j possible values and the RTS 136 has j possible pairs of storage locations, then the TDRC 100 may be designed to advance to step 380 when j or less pairs of old tag 132 and new tag 134 values have been stored.

In step 380, the PIRTC 122 causes an interrupt to be sent to the CPU 12. The CPU 12 processes the interrupt by obtaining values stored in the page index field 126 and in the RTS 136. Once the CPU 12 has obtained the values which are stored in the page index field 126 and the RTS 136, the CPU 12 may determine from the old tag fields 132, the new tag fields 134, and the page index field 126 which physical pages 37 are causing the thrashing condition as a result of being mapped to the same location in cache 22.

Once the CPU 12 has determined which physical pages 37 are thrashing, the CPU 12 may reduce thrashing between the detecting physical pages 37 by moving the thrashing physical pages 37 in physical memory 20 such that they have different values for the page index field 90. Referring back to FIG. 2 for a situation in which the CPU 12 has determined that a physical page 37A is thrashing with a physical page 37B, the CPU 12 may obtain the above result by (1) mapping an unallocated virtual page 35C to the physical page 37B, (2) mapping the virtual page 35B originally associated with the physical page 37B to a physical page 37C having a different value for the page index field 90, and (3) copying the data from the physical page 37B to the physical page 37C. By mapping in this manner, the previously thrashing physical pages 37A and 37B now are respectively stored in physical pages 37A and 37C which do not map to the same location in the cache 22 and as a result will not thrash with one another.

The algorithm for choosing new physical pages 37 for the thrashing physical pages 37 may be merely to decrement or increment the page index field 90 of the thrashing physical pages 37, or the computer system 10 could also assign unallocated physical pages 37 having different page index values to the thrashing physical pages 37. By using unallocated physical pages 37, the moved physical pages 37 do not need to be swapped with physical pages 37 already present in the main memory 20 or out to disk 24.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of detecting thrashing in a cache memory having a plurality of cache lines, comprising the steps of:

storing a first data in a first main memory location identified by a first address having a first page index and a first tag;

storing a second data in a second main memory location identified by a second address having the first page index and a second tag;

storing the first data in a first cache line identified by the first page index;

referencing the cache memory with the second address;

replacing the first data stored in the first cache line with the second data;

storing the first tag in a third memory location; and storing the second tag in a fourth memory location.

2. The method of claim 1, further comprising the step of:

updating a thrashing value associated with the first cache line.

3. The method of claim 2, wherein the steps of storing the first tag and storing the second tag are performed only after the thrashing value has satisfied a predetermined relationship with a threshold value.

4. The method of claim 3, wherein the step of updating the thrashing value includes the steps of:

updating an access value associated with the first cache line when the cache memory is referenced with the first page index; and updating a replacement value associated with the first cache line when the first data stored in the first cache line is replaced with the second data.

5. The method of claim 4, wherein the step of updating the thrashing value further includes the step of:

determining the thrashing value from the replacement value and the access value.

6. The method of claim 5, wherein the step of determining the thrashing value includes the step of:

dividing the replacement value by the access value.

7. The method of claim 1, further comprising the step of:

moving the first data from the first main memory location to a third main memory location having a third address including a second page index which identifies a second cache line.

8. The method of claim 1, further comprising the step of:

moving the second data from the second main memory location to a third main memory location having a third address including a second page index which identifies a second cache line.

9. The method of claim 1, further comprising the steps of:

maintaining a translation table for translating a first virtual address to the first address and for translating a second virtual address to the second address;

moving the first data from the first main memory location to a third main memory location having a third address including a second page index which identifies a second cache line; and updating the translation table such that the first virtual address translates to the third physical address.

10. The method of claim 1, further comprising the steps of:

updating a store count associated with the first cache line when the first tag is stored in the third memory location and the second tag is stored in the fourth memory location; and signaling a processor when the store count has a predetermined relationship with a store threshold value.

11. A cache controller for a cache memory having a plurality of cache lines, the cache controller comprising:

a page index monitor configured to update a thrashing value associated with a cache line identified by a first page index;

a page index tracker coupled to said page index monitor, said page index tracker including a tracking controller and a replacement tracking store;

said tracking controller configured to store a first tag and a second tag in said replacement tracking store when a first data stored in said cache line is replaced with a second data; and wherein said first data is also stored in a first main memory location identified by a first address having said first page index and said first tag, and said second data is stored in a second main memory location identified by a second address having said first page index and said second tag.

12. The cache controller of claim 11, wherein said page index monitor comprises:

an access counter configured to update an access value associated with said cache line when the cache memory is referenced with said said first page index; and a replacement counter configured to update a replacement value associated with said cache line when said first data stored in said cache line is replaced with said second data.

13. The cache controller of claim 12, wherein said page index monitor further comprises:

a monitor controller configured to determine said thrashing value from said replacement value and said access value.

14. The cache controller of claim 11, wherein said page index tracker further comprises:

a store counter configured to update a store count associated with said cache line when said first tag and said second tag are stored in said replacement tracking store.

15. The cache controller of claim 14, wherein:

said tracker controller is configured to generate a signal when said store count has a predetermined relationship with a store threshold value.

16. A computer system, comprising:

a processor;

a main memory;

a cache memory having a first cache line identified by a first page index;

a cache controller coupled to said processor, said main memory, and said cache memory;

said cache controller including a page index monitor and a page index tracker coupled to said page index monitor;

said page index monitor configured to update a thrashing value associated with said first cache line;

said page index tracker including a tracking controller and a replacement tracking store wherein said tracking controller is configured to store a first tag and a second tag in said replacement tracking store when a first data stored in said first cache line is replaced with a second data; and wherein said first data is also stored in a first main memory location identified by a first address having said first page index and said first tag, and said second data is stored in a second main memory location identified by a second address having said first page index and said second tag.

17. The computer system of claim 16, wherein said page index monitor comprises:

an access counter configured to update an access value associated with said first cache line when the cache memory is referenced with said first page index; and a replacement counter configured to update a replacement value associated with said first cache line when said first data stored in said first cache line is replaced with said second data.

18. The computer system of claim 17, wherein said page index monitor further comprises:

a monitor controller configured to determine said thrashing value from said replacement value and said access value.

19. The computer system of claim 18, wherein said page index tracker further comprises:

a store counter configured to update a store count associated with said first cache line when said first tag and said second tag are stored in said replacement tracking store.

20. The computer system of claim 19, wherein:

said tracker controller is configured to generate a signal when said store count has a predetermined relationship with a store threshold value, and to transfer data stored in said replacement tracking store to said processor.

21. The computer system of claim 20, wherein said processor is configured:

to maintain a translation table for translating a first virtual address to said first address and for translating a second virtual address to said second address;

to move said first data from said first main memory location to a third main memory location having a third address including a second page index which identifies a second cache line of said cache memory; and to update said translation table such that said first virtual address translates to said third physical address.

* * * * *